Aug. 26, 1969    K. G. BECKER ET AL    3,463,458
VIBRATOR

Filed July 18, 1966    3 Sheets-Sheet 1

INVENTORS
KENNETH G. BECKER
JOHN L. CREWSE
BY Baldwin, Doran & Egan
ATTORNEYS

Aug. 26, 1969  K. G. BECKER ET AL  3,463,458
VIBRATOR
Filed July 18, 1966  3 Sheets-Sheet 2

INVENTORS
KENNETH G. BECKER
JOHN L. CREWSE
BY Baldwin, Doran & Egan
ATTORNEYS

Aug. 26, 1969    K. G. BECKER ET AL    3,463,458
VIBRATOR
Filed July 18, 1966    3 Sheets-Sheet 3
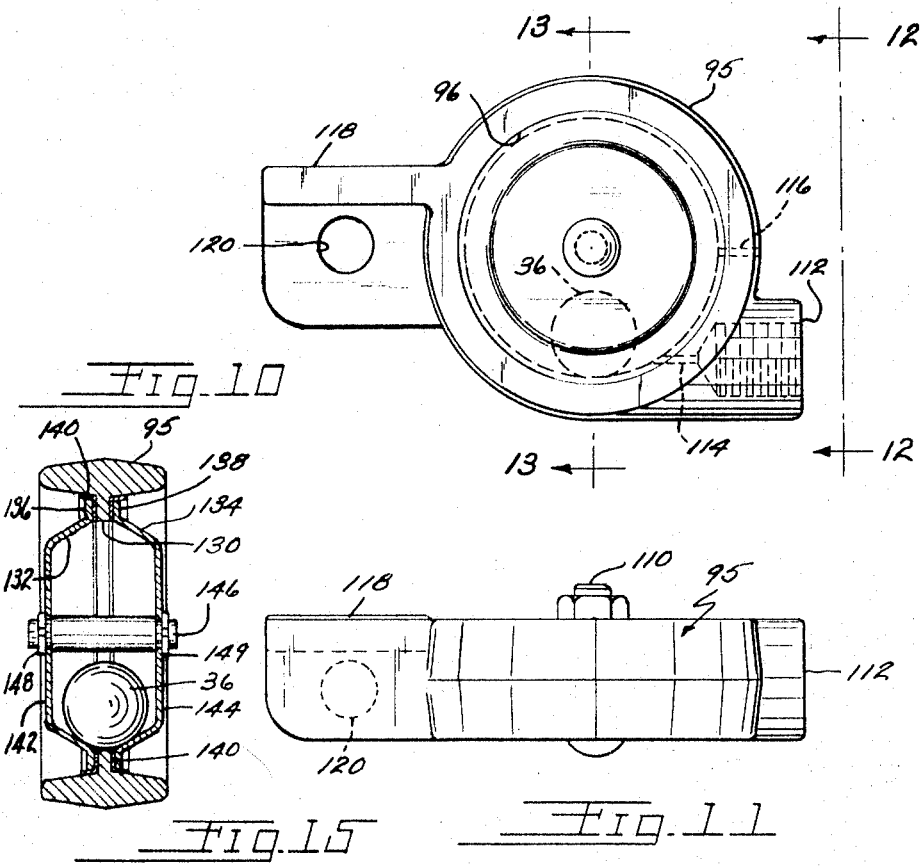
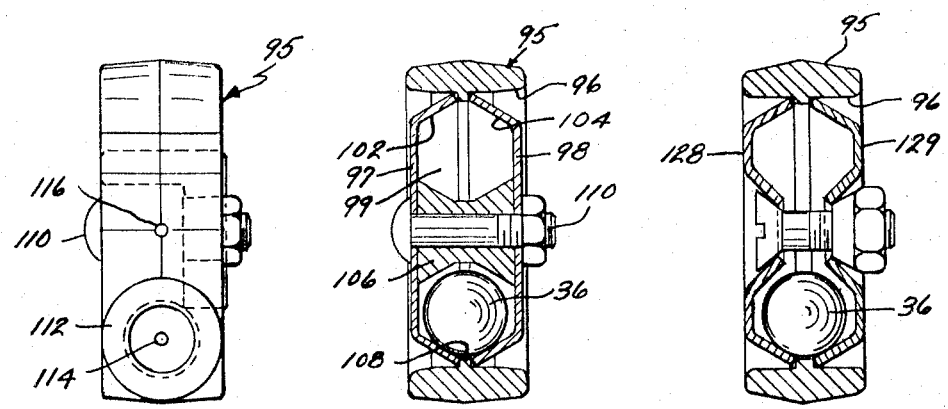
INVENTORS
KENNETH G. BECKER
JOHN L. CREWSE
BY Baldwin, Doran & Egan
ATTORNEYS �# United States Patent Office 3,463,458
Patented Aug. 26, 1969

3,463,458
VIBRATOR
Kenneth G. Becker, Cleveland, and John L. Crewse,
Brook Park, Ohio, assignors to The Cleveland Vibrator
Company, Cleveland, Ohio, a corporation of Ohio
Filed July 18, 1966, Ser. No. 565,894
Int. Cl. B01f *11/02;* B28c *5/08*
U.S. Cl. 259—1         10 Claims

ABSTRACT OF THE DISCLOSURE

A mechanical vibrator of the type comprising a housing forming a chamber in which a ball or roller is urged cyclically at high speed in an orbital path by a high pressure tangential jet of fluid. The housing forming the chamber is constructed of substantially identical matched covers of bulbous form, each of which has a curved, inturned continuous flange which is disposed in opposed, coacting relationship with the flange on the opposite cover to form an interior race around the periphery of the chamber.

---

This invention relates to vibration inducing apparatus and more particularly to mechanical vibrators of the type used for creating vibratory forces in various types of machines or devices requiring a medium to high frequency of vibration.

The need has long existed for a compact, simple and economical vibrator that is highly effective and dependable in operation. Prior vibrators of the present type usually were formed of an excessive number of expensive and unnecessarily complicated parts.

Therefore, it is an object of the invention to provide an improved, inexpensive vibrator of compact and simplified construction.

A further object of the invention is to provide a vibrator of the above type having relatively few parts which may be formed of inexpensive, easily formed sheet-metal and/or plastic materials.

A further object of the invention is to provide an improved, highly dependable vibrator which may be fabricated and sold at a cost considerably below that of prior vibrators.

A further object of the invention is to provide a simplified vibrator formed of parts designed to be positive in action without the need for extreme accuracy in manufacture.

A further object of the invention is to provide a vibrator of the above type that is simple in construction, inexpensive to manufacture, and highly effective in operation.

Briefly, the foregoing objects are accomplished by the provision of a vibrator formed of a pair of preformed, bulbous, matched covers which, when connected together in opposed coacting relation, form a chamber having a fluid inlet and a fluid outlet. Each of said covers has a curved inturned continuous flange which, when disposed in opposed coacting relationship with the flange on the opposite cover, forms an interior race around the periphery of the chamber. A rolling element such as, for example, a ball or roller, is disposed in the chamber.

In practice, pressurized fluid, such as air, is fed into the inlet and thence tangentially into the chamber where it causes the steel ball to travel in a closed path about the race thus causing vibration, such pressurized air exiting through the outlet. With this construction, only three simplified parts are required, namely, the two matched covers and the rolling element. Such covers may be formed of inexpensive sheet-metal stampings.

In a modified form of the invention, the vibrator includes a housing formed of a pair of planar matched coacting outer plates with a central cover plate interposed between the outer plates. All three plates have a centralized transverse annular aperture for receiving a pair of annular matched coacting bulbous covers which form a chamber containing the rolling element. The central cover plate may have fluid inlet and fluid outlet passageways each in communication with the chamber. The aperture in the central plate is of lesser diameter than the apertures in the outer plates, whereby, one of the bulbous covers abuts one side of the central plate and the other of the bulbous covers abuts the other side of the central plate adjacent the periphery of the central plate aperture. With this construction, the vibrator housing and the chamber are formed of inexpensive, easily formed parts.

In a further modification of the invention, the vibrator includes a housing having a centralized aperture for receiving the pair of bulbous matched covers which form the chamber containing the rolling element whereby said housing encases the outer periphery of the connected covers. The housing includes a centrally disposed annular flange formed around the periphery of the housing aperture and extending toward the center of such aperture whereby one of the covers abuts one side of the flange and the other cover abuts the other side of said flange. With this construction, only three simplified parts are used, namely, the housing encircling the covers, and the two matched coacting covers.

Other objects and advantages of the invention will be apparent from the following description taken in conjunction with the drawings wherein:

FIGURE 10 is a top plan view of still a further modified form of vibrator of the invention;

FIGURE 11 is a side elevational view of the vibrator shown in FIGURE 10;

FIGURE 12 is a view taken along the line 12—12 of FIGURE 10;

FIGURE 13 is a view taken along the line 13—13 of FIGURE 10;

FIGURE 14 is an end elevational sectional view of a modified form of vibrator of the type shown in FIGURE 10; and FIGURE 15 is an end elevational sectional view of a further modification of the vibrator shown in FIGURE 10.

In the drawings, identical parts are identified by the same number or letter in all of the figures.

Figure 1:
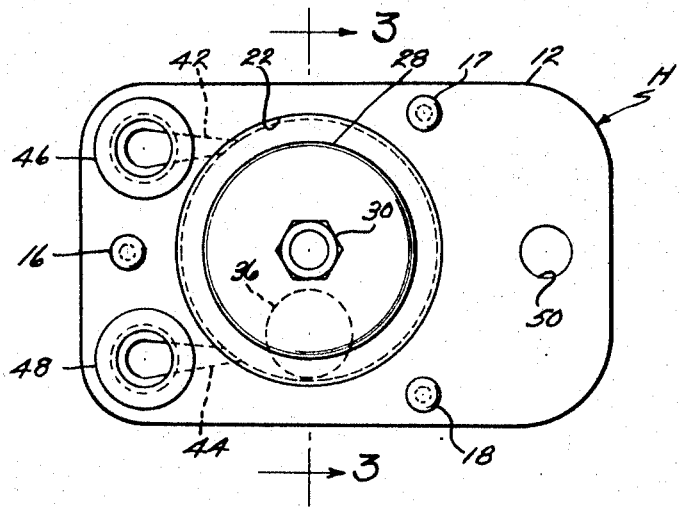
FIGURE 1 is a plan view of a vibrator constructed in accordance with the invention, and showing certain interior parts thereof in dot-dash lines.

Referring first to FIGURES 1 through 4, there is shown one form of mechanical vibrator of the invention and including a housing, generally designated as H, which comprises a pair of planar matched coacting outer cover plates 10 and 12, and a planar central plate 14 interposed between the cover plates. The plates 10, 12 and 14 may be retained together in parallel attached position, as shown, by any suitable retaining means such as the rivets 16, 17 and 18.

The connected plates 10, 12 and 14 have aligned transverse apertures 20, 22 and 24, respectively, forming an opening in the housing H for receiving a pair of bulbous, matched, concave covers 27 and 28, which may be retained in position by any suitable detachable retaining means such as the bolt 30. The bulbous covers 27 and 28 are connected in opposed coacting relationship to form a chamber 34 containing a suitable rolling element, such as the steel ball 36. The rolling element may also be a roller or cylinder. The covers 27 and 28 have curved, inturned, continuous flanges 38 and 39, respectively, disposed in opposed coacting relationship with each other to form an interior race 40 around the periphery of the chamber 34 around which the ball 36 travels to effect vibration as will be hereinafter described.

Figure 3:
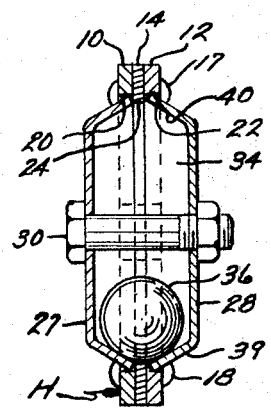
FIGURE 3 is a sectional view taken along the line 3—3 of FIGURE 1.
Figure 2:
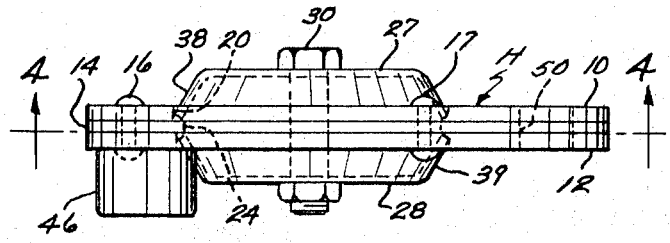
FIGURE 2 is a side elevational view of the vibrator shown in FIGURE 1.

It is to be noted that the central plate aperture 24 is of lesser size or diameter than the outer cover plate apertures 20 and 22. With this construction, the bulbous covers 27 and 28 abut the respective sides of the central plate 14 adjacent the periphery of the central plate aperture 24 as best shown in FIGURE 3. Thus, the housing H encircles or encases the outer periphery of the connected covers 27 and 28.

The central plate 14 contains a pressurized fluid inlet in the form of the passageway 42, and a pressurized fluid outlet in the form of the passageway 44. It will be understood that such passageways may be reversed, in that the passageway 42 may be the outlet if it should be desired to reverse the direction of rotation of the ball 36 in the chamber 34. The passageway 42 communicates at its inner end with the chamber 34 and at its outer end with the port 46. Likewise, the passageway 44 communicates at its inner end with the chamber 34 and at its outer end with the port 48. It is preferred that the passageways 42 and 44 lead tangentially into the chamber 34 for optimum effect in rotating the ball 36 in the chamber.

The housing H may contain mounting means in the form of the aperture 50 for detachably mounting the vibrator on an associated device to be vibrated.

In operation, pressurized fluid, such as air, is fed into the port 46, for example, thence through the passageway 42 and tangentially into the chamber 34 where it causes the ball to travel around the annular race 40 formed by the inturned flanges 38 and 39, to effect vibration. The air exits through the passageway 44 and thence out the port 48.

Figure 5:
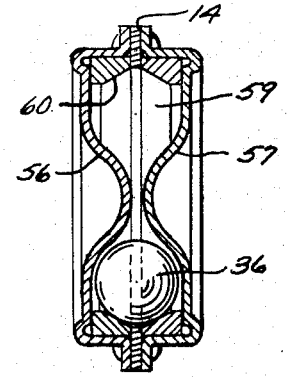
FIGURE 5 is a side elevational sectional view of a modified form of vibrator of a type similar to that shown in FIGURE 3.
Figure 4:
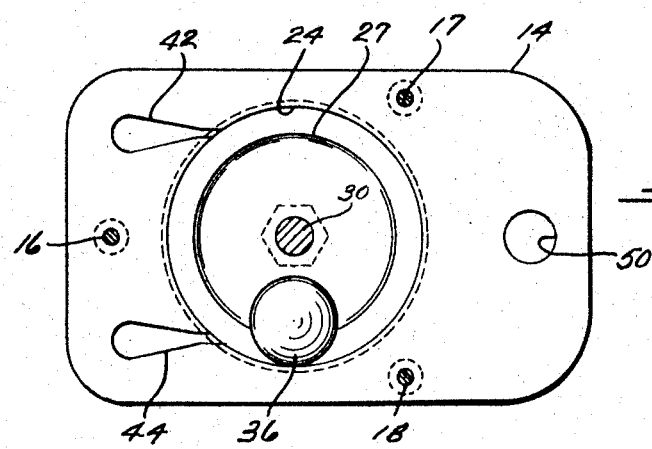
FIGURE 4 is a view taken along the line 4—4 of FIGURE 2.
Figure 7:
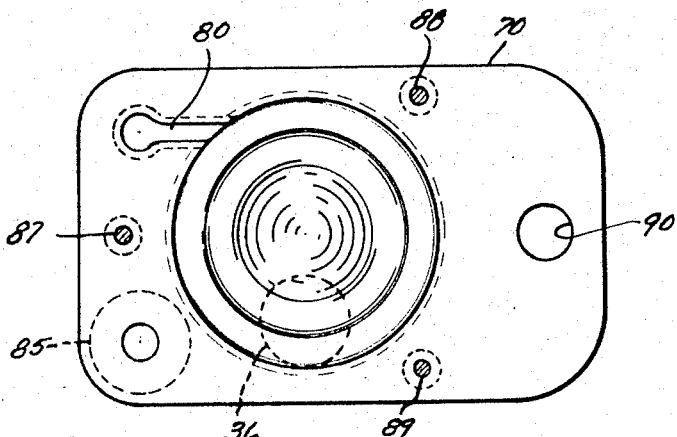
FIGURE 7 is a view taken along the line 7—7 of FIGURE 6.
Figure 6:
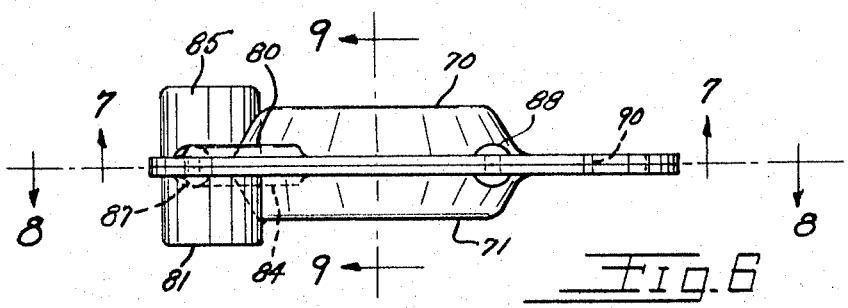
FIGURE 6 is a side elevational view of a modified form of vibrator of the invention.
Figure 8:
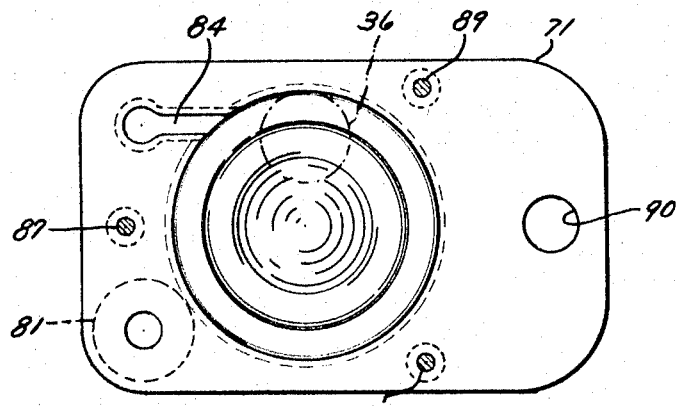
FIGURE 8 is a view taken along the line 8—8 of FIGURE 6.

In the FIGURE 5 modification, the bulbous covers 56 and 57 are constructed to effect an hourglass configuration which provides a more closed path for the ball as it rotates in the chamber 59. Additionally, a separable, annular, ground, two-piece bearing race 60 is disposed around the periphery of the chamber 59, such race being replaceable when worn out.

Figure 9:
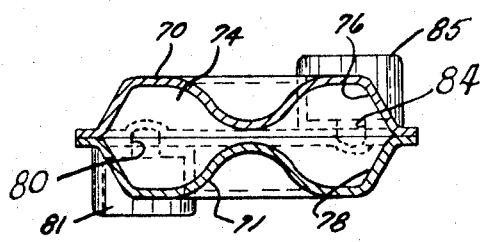
FIGURE 9 is a view taken along the line 9—9 of FIGURE 6.

Referring now to FIGURES 6 through 9, there is shown another form of mechanical vibrator of the invention and including a pair of bulbous matched, concave covers 70 and 71 connected in opposed coacting relationship to form a chamber 74 containing the usual rolling element or steel ball 36. The covers contain curved, inturned, continuous flanges 76 and 78, respectively, disposed in opposed, coacting, relationship to form an interior annular race around the periphery of the chamber 74 around which the ball 36 travels as aforedescribed. Again, the covers may be constructed to effect an hourglass configuration, as best shown in FIGURE 9, to provide a more closed or restricted path for the ball 36. The cover 70 is provided with a pressurized fluid passageway 80 connecting at its inner end tangentially with the chamber 74, and at its outer end with the port 81 in the cover 71. Likewise, the cover 71 is provided with a passageway 84 connecting at its inner end tangentially with the chamber 74, and at its outer end with the port 85. The covers 70 and 71 may be connected together by any suitable connecting means such as the rivets 87, 88 and 89. The vibrator may be attached to a device to be vibrated by any suitable connecting means including the attaching aperture 90.

In operation, pressurized fluid such as air is fed into the port 81, for example, and thence through the passageway 80, and into the chamber 74 to rotate the ball 36 thereabout. The air is exited through the passageway 84 and out the port 85. Reverse rotation of the ball can be effected by feeding the pressurized air into the port 85 and out the port 81. Although the drawings show the passageway in one cover connecting with the port in the other cover, it will be understood that the passageway in one cover could connect with the port in that cover.

Thus, with the construction shown in FIGURES 6 through 9, only three inexpensive, basic parts are required, namely, the covers 70 and 71 and the ball 36.

Referring now to FIGURES 10 through 13 there is shown a further modified form of vibrator of the invention including a generally annular housing 95 containing a transverse aperture 96 for receiving a pair of matched coacting concave covers 97 and 98 therein, in opposed coacting relationship to form a chamber 99 containing the ball 36. The covers 97 and 98 have curved, inturned, continuous flanges 102 and 104, respectively, disposed in opposed coacting relationship to form an interior race around the periphery of the chamber 99. A spool 106 may be disposed centrally in the chamber 99 to provide a more closed, restricted path for the ball.

The housing contains an annular flange 108 disposed around the periphery of the housing aperture 96 and extending toward the center of such aperture. The covers 97 and 98 are of a slightly larger diameter than the annular flange 108 whereby the cover 97 abuts one side of the flange 108 and the cover 98 abuts the other side of such flange.

The housing 95, the covers 97 and 98, and the spool 106 may all be attached together by any suitable connecting means such as the bolt 110.

The housing is provided with a pressurized fluid inlet port 112 which leads into the inlet passageway 114 and thence tangentially into the chamber 99. In practice, pressurized fluid such as air is fed into the port 112, thence through the passageway 114, into the chamber 99 to rotate the ball 36, and thence out the outlet passageway 116. The housing is also provided with an attaching lug 118 having the apertures 120 for securing the vibrator to a device to be vibrated.

In the FIGURE 14 modification, the covers 128 and 129 are constructed to effect an hourglass configuration to provide a closed path for the ball 36 as aforementioned.

Although the path in which the ball 36 travels is shown as circular in all modifications, it will be understood that such path may be elliptical.

It may be desirable in certain applications to provide a maximum fluid-tight seal between the housing flange 108 (FIGURE 13) and the adjacent abutting cover flanges 102 and 104. This may be effected by the structure of FIGURE 15, wherein the housing annular flange 130 extends inwardly toward the center of the vibrator a greater distance than in previous structures, and the cover flanges 132 and 134 are each provided with outwardly extending annular end flanges 136 and 138, respectively, disposed against the housing flange 130, as shown. To effect a fluid-tight joint, a suitable seal such as the L-shaped gasket 140 may be interposed between the flange 130 and the flanges 136 and 138. Such joint may also be sealed by a suitable plastic bonded to such flanges.

FIGURE 15 also illustrates an alternate type of means for retaining the covers 142 and 144 in attached position, in the form of the pin 146 which extends through the covers and is retained in position at each end by the spring clips 148 and 149, respectively.

In all of the above structures, a minimum of inexpensive, readily-formed parts are used. The structures are substantially simplified over that of prior vibrators. All parts are easily formed as extreme accuracy in manufacture is not essential. Thus, the present invention may be fabricated and sold at a cost well below that of prior structures.

The terms and expressions which have been employed are used as terms of description, and not limitation, and therei s no intention, in the use of such terms and expressions, of excluding any equivalents of the features shown or described, or portions thereof, but it is recognized that various modifications are possible within the scope of the invention claimed.

What is claimed is:

1. A mechanical vibrator comprising, a pair of bulbous matched covers of substantially identical configuration connected in opposed coacting relationship to form a chamber having a pressurized fluid inlet and a pressurized fluid outlet each in communication with the chamber, each of said covers having a curved inturned continuous flange disposed in opposed coacting relationship with the flange on the opposite cover to form an interior race around the periphery of the chamber, a rolling element disposed interiorly of the chamber and adapted to travel around said race to effect vibration when associated pressurized fluid is introduced into said inlet and into the chamber and thence out said outlet, and means for retaining said covers in such opposed coacting relationship.

2. The structure of claim 1 and further including a housing, said covers being concave and detachably mounted in said housing whereby the housing encases the outer periphery of the connected covers, and mounting means on said housing for detachably mounting the vibrator on an associated device to be vibrated.

3. The structure of claim 2 wherein the housing contains a transverse aperture for receiving the covers therein, said housing including a centrally disposed annular flange formed around the periphery of the aperture and extending toward the center thereof whereby one of the covers abuts one side of said last-named flange, and the other cover abuts the other side of said last-named flange.

4. The structure of claim 3 wherein said inlet and outlet each include a passageway extending from the exterior of the housing thence through the housing and thence through said last-named flange and into the chamber.

5. The structure of claim 4 wherein said housing contains an inlet port, and said inlet includes a passageway tangentially connecting the port with the chamber.

6. The structure of claim 2 wherein said housing includes a pair of planar matched coacting outer cover plates, a planar central plate interposed between the cover plates, and means for retaining said plates in parallel attached position, said cover plates and said central plate each having a transverse aperture in alignment with the respective apertures in the other plates to form a housing opening for receiving said covers, the aperture in said central plate being of lesser size than the apertures in the other plates whereby one of the covers abuts one side of said central plate adjacent the periphery of the central plate aperture, and the other cover abuts the other side of said central plate adjacent the periphery of the central plate aperture.

7. The structure of claim 6 wherein said inlet and outlet each includes a passageway formed in said central plate, and at least one of the cover plates contains a port, said passageways being in communication at one end tangentially with said chamber and at the other end with said port.

8. The structure of claim 1 wherein a separable annular ground bearing race is disposed in said chamber around the periphery thereof.

9. The structure of claim 1 wherein said inlet and outlet each includes a passageway formed in one of the covers, and said last-named cover contains at least one port, said passageway being in communication at one end tangentially with said chamber and at the other end with said port.

10. The structure of claim 6 wherein the inlet is formed in one cover and the outlet is formed in the other cover.

References Cited

UNITED STATES PATENTS

| | | | | |
|---|---|---|---|---|
| 2,496,291 | 2/1950 | High | | 259—1 |
| 2,520,044 | 8/1950 | Mason | | 259—1 |
| 2,528,319 | 10/1950 | Peterson | | 259—1 |
| 2,917,290 | 12/1959 | Peterson | | 259—1 |
| 3,266,327 | 8/1966 | Felixon. | | |

WALTER A. SCHEEL, Primary Examiner

JOHN M. BELL, Assitant Examiner

U.S. Cl. X.R.

74—87